Jan. 5, 1937.    G. E. BECKER    2,066,666
POWER OPERATED CULTIVATOR
Filed June 5, 1935

INVENTOR
Gus E. Becker
BY
Miller Boyken & Bird
ATTORNEY

Patented Jan. 5, 1937

2,066,666

UNITED STATES PATENT OFFICE 2,066,666

POWER-OPERATED CULTIVATOR

Gus E. Becker, Fresno, Calif.

Application June 5, 1935, Serial No. 25,023

5 Claims. (Cl. 97—232)

This invention relates to power-operated cultivators and similar farming equipment mounted on wheels and adapted to be driven under its own power while straddling rows of growing plants, for loosening or otherwise conditioning the soil, also used for seeding by attaching other equipment.

The objects of the invention are to provide an improved design of such machines whereby when driving along in straddling relation to the rows of growing plants the driver or operator seated above will have an unobstructed view of the cultivator or other blades engaging the soil adjacent the plants in the rows at both sides of the machine, and not be forced to drive blindly ahead while trusting to luck that the tools are doing their work properly in back of him, or concealed from view by the engine and other parts of the machine as required with the machines now in use.

Other advantages of my improved machine are lightness and lower cost of manufacture, while still other advantages will appear in the following description and accompanying drawing.

Figure 1:
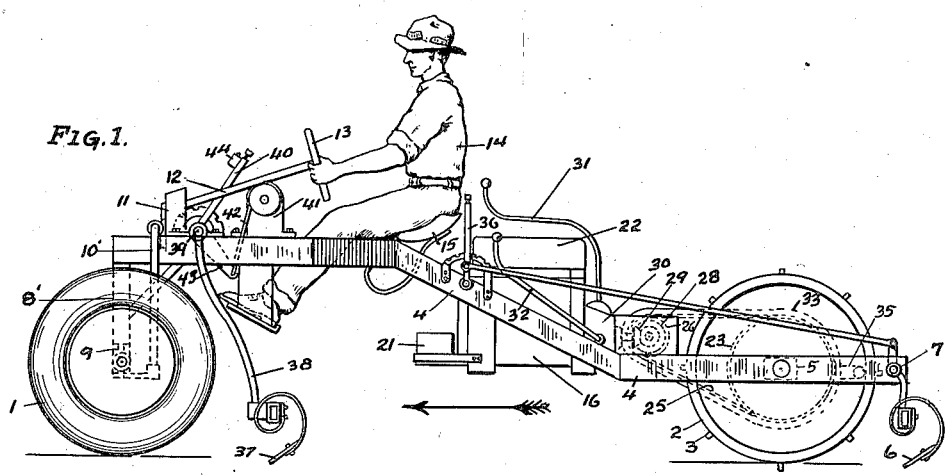

In the drawing Fig. 1 is a side elevation of my improved power-driven cultivator.

Figure 2:
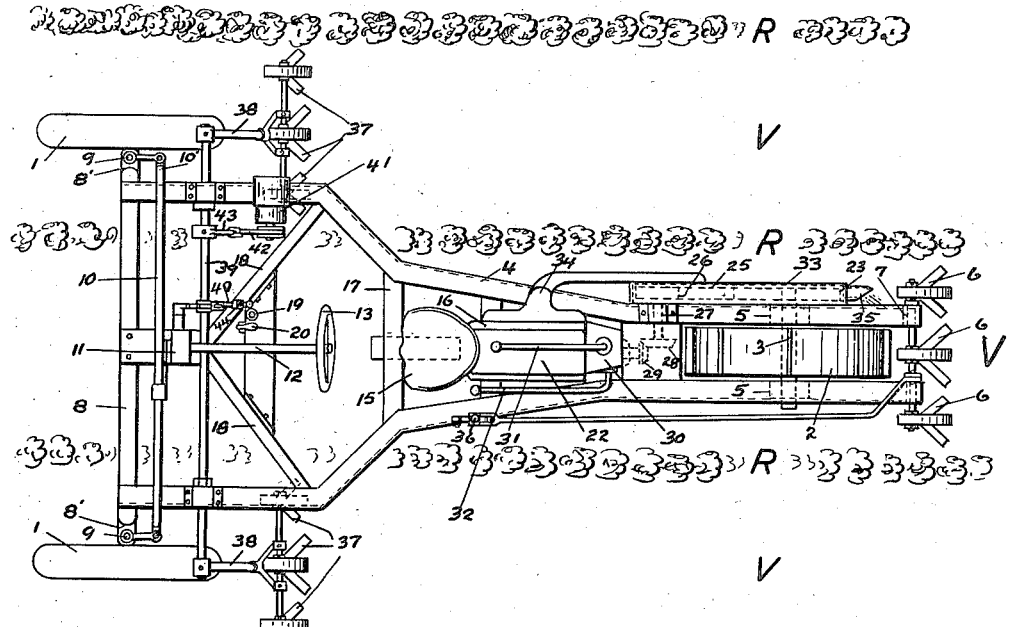

Fig. 2 is a plan view of the machine of Fig. 1.

Briefly described my improved construction which makes the work visible at all times to the driver, consists in providing a seat for the driver and controls for the power plant and the soil tools, as well as the steering wheel, all in position so that the driver will be in front of the engine with substantially nothing to interfere with a free outlook forward in the direction the machine is traveling as well as downward on both sides to see whether the tools are loosening up the ground properly and how close they are to the growing rows of plants. In the drawing I have shown the invention carried out with a three-wheel vehicle arranged to straddle two rows of plants and with its third wheel at the rear between the rows, but it is evident that the vehicle can be of any width to straddle as many rows as desired, also it need not be confined to having but one wheel at the rear end as it may be of four wheels, but it is cheaper and lighter when built of three wheels.

In the drawing R, R, R, R, represent the spaced rows of growing plants, while V, V, V, represent the spaces or valleys between the rows. The machine shown has two front supporting and steering wheels 1 spaced to straddle two rows, and one rear driving wheel 2 preferably with grousers 3. These wheels are on a light steel frame 4 which is generally Y shape in plan, and in elevation is raised sufficiently in front to clear the two growing rows of plants, and after coming together within these rows the elongated part of the frame extending rearwardly is lowered sufficiently to properly support the driving wheel axle bearings 5 as indicated as well as to support at its extreme rear end a set of soil implements or cultivator blades 6 pivotally mounted at 7 on the frame.

At the extreme forward end of the frame the transverse member 8 which connects the two sides of the Y frame may be considered the front axle as it turns downward on both sides as at 8' to pivotally carry the usual wheel spindle knuckles 9 which support the wheels, and which knuckles are pivotally connected to the similarly downwardly extending ends 10' of an elevated drag link 10 moved back and forth longitudinally by a suitable gear connection 11 from a steering post 12 of a steering wheel 13 in position to be grasped by a driver 14 seated on a seat 15 facing forward and with his back to the engine 16 which is to the rear and generally below the seat.

The seat is supported from a cross brace 17 of the Y frame, while from two angular braces 18 is suspended a foot "board" for the driver's feet and upon which the usual engine starter 19 and foot throttle 20 are located and connected by suitable wiring and bell crank rods (not shown) for controlling the engine in the well known manner. The battery is preferably as at 21 on a bracket forward of the engine 16, while the gasoline or other fuel tank is preferably carried as at 22 above the engine.

The single rear wheel drive is effected preferably through means of a sprocket 23 on one end of the rear driving axle 24 over which a chain 25 runs to a smaller forward sprocket indicated at 26 mounted on a short transversely extending shaft 27 driven by bevel gears 28, 29 at the rear of the engine transmission gear box 30, while extending upwardly and forwardly are the usual shift and clutch levers 31, 32 which can be operated by the driver reaching just behind him to either side.

Since such farm implements just run at one speed as a rule and do not stop for hours as they turn at the ends of the rows at the same speed, the awkwardness of having the clutch and gear lever as shown are of no importance.

The chain drive is entirely covered with a sheet metal housing 33 and the exhaust gases of the engine from the exhaust manifold 34 are preferably directed into this chain drive housing to finally exhaust from an opening 35 at the rear of the housing. This sets up a little pressure within the chain drive housing and prevents the ingress of dirt and dust through its unavoidable crevices as otherwise would take place.

The rear implements 6 may be raised or lowered and locked in any position by means of a quadrant hand lever 36, and extending across the valleys back of the front wheels are similar cultivator implements 37 carried on arms 38 depending from a transverse bar 39 on the frame which may be rotated to any desired degree by a quadrant hand lever 40 to lock the implements at any point, or which may be more conveniently raised by the aid of a small motor hoist 41 with a hoist cable or chain 42 connected to a crank lever 43 extending from bar 39, and which motor may be set in motion from a push button or other suitable switch located conveniently to the driver as at 44, and the tools locked in desired elevation by the quadrant lever lock and which also, of course, holds the tools down when digging the soil.

From the above description and drawing it will be seen that the driver has a clear view ahead with no engine or frame to obstruct his view, and that the digging operations of the forward tools are plainly visible at both sides, so that he can see the effect and may raise or lower them to suit; also he has precise control of how close to run to either row, and knows that the rear tools 6 must necessarily be in the right position in the central valley as they follow the single driving wheel and that must be in the right place in order for the front wheels to be.

A machine of this kind is about a third or more lighter than the double wheel rear drive machines now in use, operates with much less power and gives the operator or driver a control over his field work not possible heretofore.

It is evident without further drawings that various soil implements may be substituted for the cultivator blades shown, and/or seeders may additionally be carried by the machine as is done with the old type of machines now in use.

Having thus described my invention, what I claim is:

1. A farm implement vehicle comprising a chassis frame substantially of Y shape when viewed in plan, the two legs of the Y being elevated to clear growing crops and the tail of the Y being lowered and provided with a ground traction wheel arranged to roll in a path between two rows of crops, spaced steering wheels at the wide end of the frame supported thereby to roll in the spaces to the outer sides respectively of said two rows of growing crops, an engine carried by the narrow part of the frame at a point between said two rows of growing crops and operatively connected with said ground traction wheel, a driver's seat arranged to accommodate a driver facing forward toward the wide end of the frame, soil tools carried at opposite sides of the driver in position to be clearly visible to him at all times, said tools being adapted to engage the soil at the outer sides of said two rows of growing crops and behind said steering wheels, and controls for the engine, tools and vehicle accessible to the operator so positioned, the normal direction of travel of said vehicle being with the steering wheels leading and soil tools carried at the narrow end of said frame adapted to engage the soil behind said traction wheel and between said two rows of crops.

2. A farm vehicle comprising a frame supported by forward and rear ground wheels spaced to roll in the valleys between rows of growing crops, said frame elevated to clear the crops, a seat for an operator of the vehicle, a driving engine for the vehicle supported on the frame at the rear of the operator's seat and operatively connected with a rear wheel of the vehicle for driving the same, soil tools arranged to operate in a plurality of valleys at points sufficiently forward of the operator so as to be clearly visible to him at all times and his view ahead being substantially unobstructed, soil tools arranged at the rear of the vehicle to engage the soil behind any rear wheel, and controls for the engine, tools and vehicle all accessible to the operator in position on said seat, said frame being substantially Y-shape in plan with two front steering wheels supported by the wide part of the frame and a single driving ground wheel supported by the narrow end of the frame, a chain drive from said engine enclosed in a housing, and the engine arranged to exhaust through said housing.

3. A farm implement vehicle comprising a frame supported by forward and rear ground wheels spaced to roll in the valleys between rows of growing crops, said frame elevated to clear the crops, a seat for an operator of the vehicle, a driving engine for the vehicle supported on the frame at the rear of the operator's seat and operatively connected with a rear wheel of the vehicle for driving the same, soil tools arranged to operate in a plurality of valleys at points sufficiently forward of the operator so as to be clearly visible to him at all times and his view ahead being substantially unobstructed, soil tools arranged at the rear of the vehicle to engage the soil behind any rear wheel, and controls for the engine, tools and vehicle all accessible to the operator in position on the seat, said frame being substantially Y-shape in plan with two front steering wheels supported by the wide part of the frame, and a single driving ground wheel supported by the narrow end of the frame, a front axle joining the two forward ends of the Y frame with its ends turned downwardly from the elevated frame to support the two steering wheels, said steering wheels connected to the lower ends of the axle by conventional steering knuckles, and an elevated drag link extending transversely of the frame having its ends turned downwardly and pivotally connected to the steering knuckles.

4. A farm implement vehicle comprising a frame supported by forward and rear ground wheels spaced to roll in the valleys between adjacent rows of growing crops, said frame being elevated to clear the crops, a seat for an operator of the vehicle, a driving engine for the vehicle supported on the frame rearwardly of the operator's seat operatively connected with a rear wheel of the vehicle for driving the same, a plurality of gangs of soil tools arranged with one gang behind and extending laterally outwardly on opposite sides of each of the ground wheels, the gangs behind the forward ground wheels being adapted to engage the ground at points sufficiently forward of the operator so as to be clearly visible to him at all times and his view ahead being substantially unobstructed, and controls for the engine, ground tools, and vehicle being arranged for accessibility of the operator in position on the seat.

5. A farm implement vehicle comprising a frame supported at its forward end by a pair of ground wheels and at its rear end by a single power driven ground wheel, said single power driven wheel being adapted to roll in the valley between a pair of rows of growing crops and the pair of forward ground wheels being spaced to roll respectively in the valley on the outer sides of and adjacent the pair of rows between which the rear ground wheel is adapted to roll, soil tools positioned behind each of the forward wheels and behind the rear wheel, the tools behind the front wheels being spaced to cultivate only the ground in the valleys in which the front wheels are adapted to roll leaving the valley between said forward wheels clear of soil tools other than the soil tools behind the rear ground wheel, a seat for an operator of the vehicle positioned rearwardly of the soil tools that are positioned behind the front ground wheels, a driving engine for the rear ground wheel positioned rearwardly of the operator's seat and means for steering the vehicle.

GUS E. BECKER.